US012618522B2

(12) United States Patent
Dichter

(10) Patent No.: US 12,618,522 B2
(45) Date of Patent: May 5, 2026

(54) FEEDTHROUGH FOR A PRESSURE VESSEL

(71) Applicant: EnerVenue Holdings, Ltd., Fremont, CA (US)

(72) Inventor: Nelson Dichter, Oakland, CA (US)

(73) Assignee: EnerVenue Holdings, Ltd., Fremont, CA (US)

( * ) Notice: Subject to any disclaimer, the term of this patent is extended or adjusted under 35 U.S.C. 154(b) by 0 days.

(21) Appl. No.: 17/703,629

(22) Filed: Mar. 24, 2022

(65) Prior Publication Data

US 2023/0304635 A1 Sep. 28, 2023

(51) Int. Cl.
*F17C 13/00* (2006.01)

(52) U.S. Cl.
CPC .... *F17C 13/002* (2013.01); *F17C 2203/0304* (2013.01); *F17C 2209/228* (2013.01)

(58) Field of Classification Search
CPC ............ F17C 13/002; F17C 2203/0304; F17C 2209/228; F17C 2205/0302; F17C 2205/03; F17C 2205/0305; F17C 2205/0323; F17C 13/06; F17C 13/04
USPC .......................................................... 220/581
See application file for complete search history.

(56) References Cited

U.S. PATENT DOCUMENTS 3,109,055 A * 10/1963 Ziegler ................ H01B 17/306 174/152 R
4,401,734 A 8/1983 Meyer et al.
4,560,232 A * 12/1985 O'Hara ................... F17C 13/00 220/582
6,248,138 B1 6/2001 Lafave et al.
6,488,317 B1 12/2002 Daoud et al.
6,511,099 B2 1/2003 Hummel et al.
10,790,611 B1 9/2020 Huang et al.
2010/0032934 A1* 2/2010 Veenstra .............. B60K 15/013 141/82
2010/0206887 A1* 8/2010 Hashim ................. F17C 13/025 73/718

(Continued)

FOREIGN PATENT DOCUMENTS

CA 732746 A 4/1966
DE 4039724 C1 2/1992
DE 102006062609 A1 7/2008

(Continued)

OTHER PUBLICATIONS

"Knuckle Thread" retrieved from http://web.archive.org/web/20161224230258/https://en.wikipedia.org/wiki/Knuckle_thread, dated Nov. 25, 2016 (Year: 2016).*

(Continued)

*Primary Examiner* — Laura E. Parker
(74) *Attorney, Agent, or Firm* — Haynes and Boone, LLP

(57) ABSTRACT

A feedthrough for use with a pressure vessel is presented. In some embodiments, the feedthrough is formed with an insulator portion with insulator threads that mate with threads of a body portion. In some embodiments, the threads can be rounded or square threads. In some embodiments, the insulator portion includes a through hole and a fill structure. The fill structure can include a fill-tube that can be used to communicate with the pressure vessel where the body portion is attached. In some embodiments, the insulator portion can include additional through-holes to receive one or more conductors.

7 Claims, 9 Drawing Sheets

(56) References Cited

U.S. PATENT DOCUMENTS

| | | | | |
|---|---|---|---|---|
| 2011/0233218 A1* | 9/2011 | Uchimura | ................. | F17C 1/06<br>220/581 |
| 2021/0254413 A1* | 8/2021 | Campbell | ............. | F16L 15/002 |

FOREIGN PATENT DOCUMENTS

| | | | | |
|---|---|---|---|---|
| DE | 202009016940 U1 | 3/2010 | | |
| JP | S6225855 U | 2/1987 | | |
| JP | 2007303648 A | 11/2007 | | |
| JP | 2018082522 A | 5/2018 | | |
| WO | WO-2011151265 A2 * | 12/2011 | ........... | H02G 15/013 |

OTHER PUBLICATIONS

English Machine Translation of WO-2011151265-A2 (Year: 2011).*

Conradie, "Screwy Math for Super Fine Adjustments: Differential Screw," Mar. 21, 2020, Hackaday, retrieved from https://hackaday.com/2020/03/21/screwy-math-for-super-fine-adjustments-differential-screws/ (Year: 2020).*

International Search Report and Written Opinion from PCT/US2023/064193, dated Mar. 10, 2023, 13 pages.

Office Action for Japanese Patent Application 2024-547931, dated Aug. 26, 2025, 7 pages.

Decision of Grant for Japanese Patent Application 2024-547931, dated Dec. 16, 2025, 1 page.

* cited by examiner

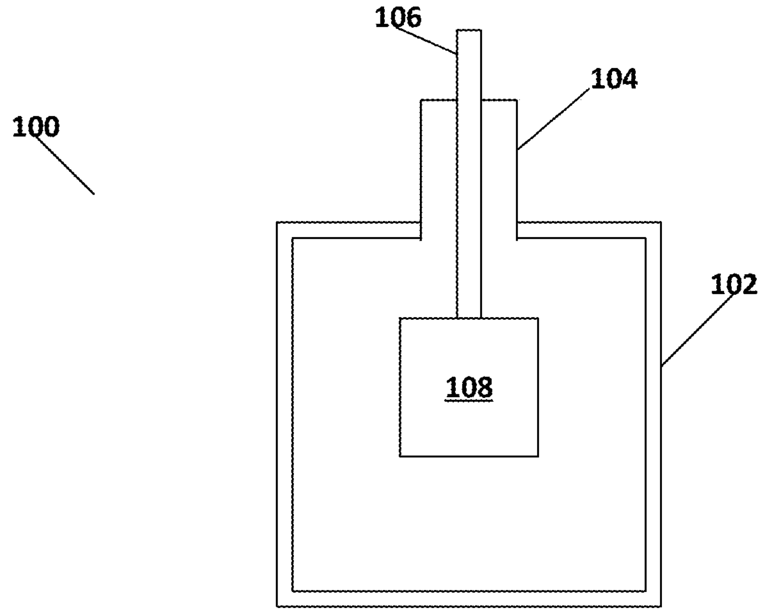
Figure 1
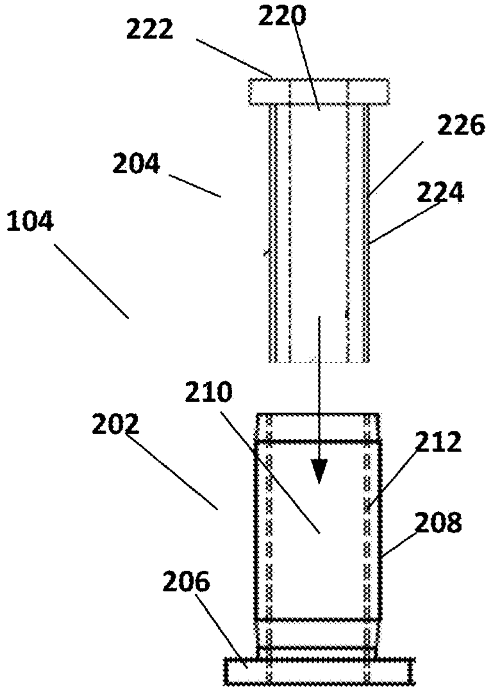
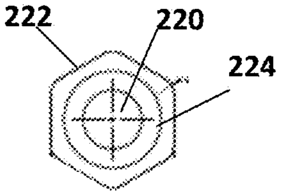
Figure 2B
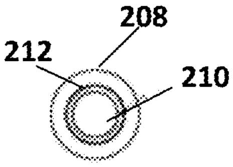
Figure 2C
Figure 2A

FEEDTHROUGH FOR A PRESSURE VESSEL

TECHNICAL FIELD

Embodiments of the present invention are related to a feedthrough for use in a pressure vessel.

DISCUSSION OF RELATED ART

Pressure vessels are used in a variety of application, including metal hydrogen batteries, hydrogen storage vessels, and other applications. For renewable energy resources such as wind and solar to be competitive with traditional fossil fuels, large-scale energy storage systems are needed to mitigate their intrinsic intermittency. Metal hydrogen batteries can be used in such applications. Additionally, storage of high-pressure gas or fuel gasses such as hydrogen can be used to store energy. Feedthroughs that allow for gas or liquid flow as well as electrical communications with the contents of a pressure vessel are important. However, feedthroughs that provide sufficient access and sealing properties are difficult to provide.

Consequently, there is a need for better feedthroughs for pressure vessel applications.

SUMMARY

In accordance with embodiments a feedthrough that can be used in pressure vessels is presented. A feedthrough according to some embodiments includes a body that includes a base portion configured to be attached to a pressure vessel, a barrel portion coupled to the base portion, a through-hole formed through the base portion and the barrel portion, and threads formed on the inner portion of the through-hole, the threads having a rounded or a square thread; and an insulator that includes a top portion, a barrel portion coupled to the top portion, a through-hole formed through the top portion and the barrel portion, and threads formed on the outer portion of the barrel portion; and wherein the insulator is screwed into the body to form the feedthrough.

In some embodiments, a method of operating a feedthrough attached to a pressure vessel includes screwing an insulator into a body, the body being attached to the pressure vessel, wherein the insulator and the body both include threads that are rounded or square to form a seal between the threads of the body and the threads of the insulator; inserting a component through a through-hole in the insulator; compressing the body to form seals between the component and the through-hole in the insulator and the threads of the insulator and the body; and removing the first pipe and the second pipe.

In some embodiments, a method of operating a feedthrough attached to a pressure vessel includes screwing an insulator into a body, the body being attached to the pressure vessel, wherein the insulator and the body both include threads; inserting a component through a through-hole in the insulator such that an interference seal is formed between the component and the insulator; using a fill structure formed in the insulator, the fill structure including a first pipe extending from the insulator and communicating with a fill through-hole in the insulator and a second pipe angularly extending from the insulator and communicating with the fill through-hole in the insulator, wherein the first pipe includes a barrier; inserting a plug through the barrier in the first pipe and into the fill through-hole; compressing the body to form seals between the component and the through-hole in the insulator, the plug and the fill through-hole in the insulator, and the threads of the insulator and the body; and removing the first pipe and the second pipe.

In some embodiments, a feedthrough includes a body, the body including a base portion configured to be attached to a pressure vessel, a barrel portion coupled to the base portion, a through-hole formed through the base portion and the barrel portion, and threads formed on the inner portion of the through-hole; and an insulator, the insulator including a top portion, a barrel portion coupled to the top portion, a through-hole formed through the top portion and the barrel portion, threads formed on the outer portion of the barrel portion, a bottom thread of the threads being tapered, and one or more additional through-holes formed in the top portion and the barrel portion of the insulator; and wherein the insulator is screwed into the body to form the feedthrough.

These and other embodiments are discussed below with respect to the following figures.

BRIEF DESCRIPTION OF THE FIGURES

An understanding of the features and advantages of the technology described in this disclosure will be obtained by reference to the following detailed description that sets forth illustrative aspects with reference to the following figures.

FIG. 1 illustrates an example of a pressure vessel with a feedthrough according to some embodiments of the present disclosure.

FIGS. 2A, 2B, and 2C illustrate a conventional feedthrough that can be used with a pressure vessel such as that shown in FIG. 1.

Figure 3A:
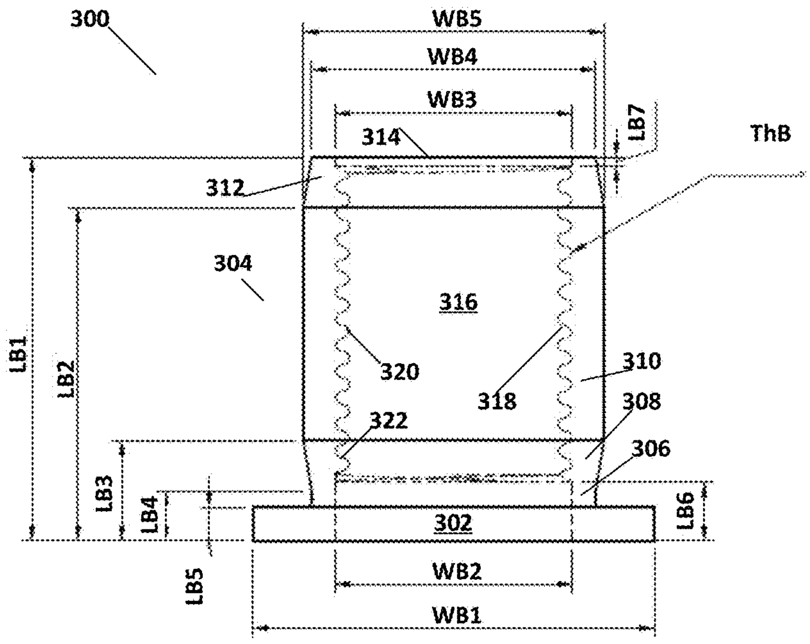
FIGS. 3A and 3B illustrate a body portion of a feedthrough according to some embodiments.

These figures are further discussed below.

DETAILED DESCRIPTION

In the following description, specific details are set forth describing some aspects of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. Such modifications may include substitution of known equivalents for any aspect of the disclosure in order to achieve the same result in substantially the same way.

Consequently, this description illustrates inventive aspects and embodiments that should not be taken as limiting—the claims define the protected invention. Various changes may be made without departing from the spirit and scope of this description and the claims. In some instances, well-known structures and techniques have not been shown or described in detail in order not to obscure the invention.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Further, individual values provided for particular components are for example only and are not considered to be limiting. Specific dimensional values for various components are there to provide a specific example only and one skilled in the art will recognize that the aspects of this disclosure can be provided with any dimensions. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In the figures, relative sizes of components are not meaningful unless stated otherwise and should not be considered limiting. Components are sized in the figures to better describe various features and structures without consideration of the displayed sizes with respect to other components. Further, although specific dimensions to describe one example of a feedthrough, those specific dimensions are provided as an example only and are not limiting. Feedthroughs according to aspects of the following disclosure can be formed having any dimensions with components having any relative dimensions. Actual dimensions depend on particular application of feedthrough according to some embodiments.

Feedthrough according to some embodiments of the present disclosure include a body portion and an insulator portion. The body portion is formed of a material that can be attached to a pressure vessel. For example, the body portion may be formed of stainless steal and be welded to a wall of the pressure vessel so that the feedthrough provides access to the interior of the pressure vessel. In some embodiments of feedthrough according to some embodiments, threads formed in a through-hole of the body portion that mate with threads formed on the insulator portion have a rounded or square shape to provide for increased sealing with those threads. In some embodiments, bottom threads of the insulator portion are tapered to provide further increases of the seal when the threads are engaged. In general, the insulator includes a through-hole that receives a component such as a feedthrough terminal that provides access to the interior of the pressure vessel. In some further embodiments, the insulator further includes additional through-holes in addition to the through-hole that receives the terminal. In some embodiments, the additional through-holes form a fill structure that provides access to exchange gas and liquid with the interior of the pressure vessel. In some embodiments, the additional through-holes accommodate additional conductors to provide electrical access to the interior of the pressure vessel.

FIG. 1 depicts a system 100 with a feedthrough 104 attached to a pressure vessel 102. Pressure vessel 102 can be any pressure vessel and may contain gas, liquid, or a combination of gas and liquid materials. Pressure vessel 102 can, for example, be a hydrogen-metal battery. Feedthrough 104 can be a feedthrough according to embodiments of the present disclosure as described below. In the example illustrated in FIG. 1, a component 106 engaged with feedthrough 104 to communicate with a structure 108 mounted in the interior of pressure vessel 102. Structure 108 may, for example, be an electrode stack of a battery. Component 106 can be, for example, a conducting rod such as a terminal for a battery. However, component 106 can be any cylindrical component that extends from the interior of pressure vessel 102 to the exterior of pressure vessel 102.

FIGS. 2A through 2C illustrates a conventional example of feedthrough 104. Feedthrough 104 as illustrated in FIG. 2A is commonly referred to as a "Ziegler Feedthrough." As illustrated in FIG. 2A, feedthrough 104 includes a body portion 202 and an insulator portion 204. Body portion 202 includes a base 206 and a barrel 208 formed from a single piece of material. Body portion 202 is formed of a material that can be attached to pressure vessel 102. For example, body portion 202 can be metallic, for example stainless steel, so that it can be welded to the metallic pressure vessel 102. Body portion 202 has a through-hole 210 that passes through both barrel 208 and base 206 of body portion 202. As is further illustrated, body portion 202 has internal threads 212 formed on the inside of through-hole 210. Threads 212 are typically pipe threads or "Whitworth threads" where each of the threads is triangular shaped. FIG. 2C illustrates a cross sectional view of body barrel 208 as described above.

As is further illustrated, insulator portion 204 includes a top portion 222 and an insulator barrel 224. A through hole 220 passes through insulator 204. The outside of insulator barrel 224 includes threads 226 that mate with threads 212 of body 202, and therefore are also triangularly shaped comment pipe threads. Insulator 204 can be formed from any insulating material capable of deforming to form seals, for example a plastic material, that insulates component 106 from body portion 104 and therefore pressure vessel 102. FIG. 2B illustrates a cross section through top portion 222. Top portion 222 is arranged to facilitate the insertion of insulator 204 into body 202 to form the conventional feedthrough 104.

During operation, after body portion 206 is attached to pressure vessel 102, insulator portion 204 can be screwed into body 202. The threads 212 of body 202 and threads 226 can be Whitworth threads so that a seal is formed between threads 212 and 216. The through-hole 220 in insulator 204 receives the component 106 as illustrated in FIG. 1. Once assembled and component 106 in place, barrel 208 of body portion 202 can be compressed and plastically deformed to finalize the seal between component 106 and insulator 204.

However, there are several deficiencies in the conventional arrangement illustrated in FIGS. 2A through 2C. One such deficiency is that the seal formed by conventional threads 212 and 216 are not sufficient enough to maintain the pressure of pressure vessel 102 themselves. A second deficiency is that feedthrough 104 as illustrated in FIGS. 2A through 2C can only accommodate a single component 106. There is a need for feedthroughs that can accommodate multiple components, such as fill tubes or other conductors.

Some embodiments of feedthrough 104 according to the present disclosure include threads that are rounded or square shaped to provide for improved sealing. Some embodiments can accommodate multiple components. Such multiple components can include combinations of one or more of fill tubes, conductors such as control wires or terminals, and other devices that facilitate access to the interior of the pressure vessel 102.

Figure 3B:
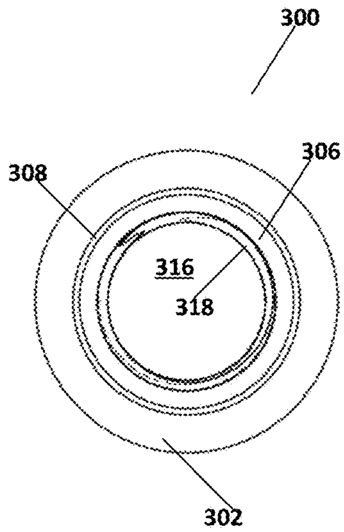

FIGS. 3A and 3B illustrate an example of a feedthrough body 300 according to some embodiments of the present disclosure. As shown in FIG. 3A, feedthrough body 300 includes a base portion 302 and a barrel portion 304. As illustrated, base portion 302 has an outer diameter of $W_B$1 and a length $L_B$5. Feedthrough body 300 includes a through-hole 316 that extends through the center of barrel portion 304 and base 302. Barrel portion 304 includes inner threads 318 formed on the wall of through-hole 316 in a portion of through-hole 316. The inner diameter of through-hole 316 can have diameter $W_B$2, with threads 318 extending from the side of through-hole 316.

As is illustrated in FIG. 3A, barrel portion 304 can be separated into sections 306, 308, 310, 312, and 314. Section 306 is a flat portion extending from base 302 that may have an outer diameter $W_B$4 and length $L_B$4. Through-hole 316 in section 306 may not include threads 318. Section 308 is a transition section where the outer diameter of barrel 304 goes from $W_B$4 to $W_B$5 over a distance from length $L_B$4 to length $L_B$3, each measured from the bottom of base 302. Section 312 is also a transition section where the outer diameter of barrel 304 goes from $W_B$5 to $W_B$4 over the distance from length $L_B$2 to $L_B$1, measured from the bottom of base 302. Section 310 represents a crush portion that, in a final step of forming a feedthrough, is compressed and plastically deformed to form seals as is further described below. Section 314 illustrates a section of depth $L_B$7 at the top where through-hole 316 has an inner diameter of $W_B$3. FIG. 3B illustrates a cross sectional view from the top of body 300.

Embodiments of body 300 can have conventional threads as described above. However, some embodiments of body 300 can include threads 318 that are formed in a fashion that facilitates better sealing at threads 318 when an insulator is screwed into body 304. In these embodiments, threads 318, instead of being conventional threads as discussed above, have teeth 320 that are square or rounded shapes that form better seals with similarly shaped threads in the insulator. For example, thread 318 can be "knuckle threads," which are unusually rounded thread forms with large spaces between the rounded crests and valleys. One standard of "knuckle threads" is the DIN 405 standard, which refer to knuckle threads with a flat thirty (30)-degree flank thread angle. For example, threads 318 can have the thread designation $Th_B$.

Embodiments of the present disclosure can include conventional threads or can include the "knuckle threads" as described above. Further, in some embodiments, threads 318 can be tapered in the bottom threads 322 of threads 318 by gradually descreasing the pitch diameter towards the bottom of body 300.

A particular example of body 300 that may be used, for example, in a metal-hydrogen battery can have the particular dimensions: $L_B$1=46.0 mm; $L_B$2=40.0 mm; $L_B$3=12.0 mm; $L_B$4=6.0 mm; $L_B$5=4.0 mm; $L_B$6=7.0 mm; $L_B$7=1.0 mm; $W_B$1=48.0 mm; $W_B$2=28.4 mm; $W_B$3=28.4 mm; $W_B$4=34.0 mm; $W_B$5=36.0 mm; and $Th_B$=DIN 405 RD 28×⅛ threads. These dimensions are provided as a particular example only and are not considered to be limiting. The particular dimensions of body 300 can be determined any particular application of the invention.

Figure 4A:
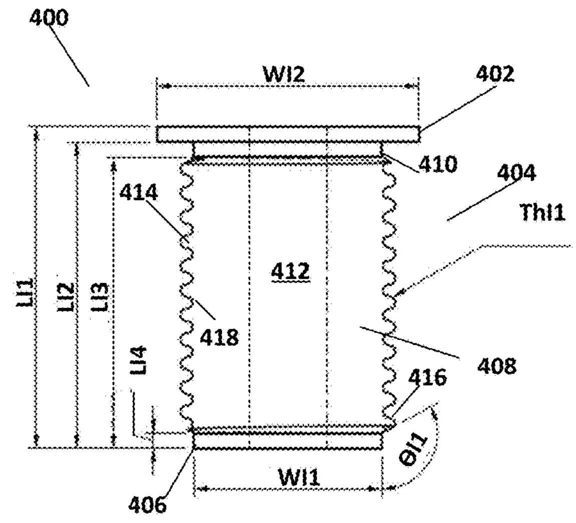
FIGS. 4A and 4B illustrate an embodiment of an insulator portion of a feedthrough according to some embodiments.
Figure 4B:
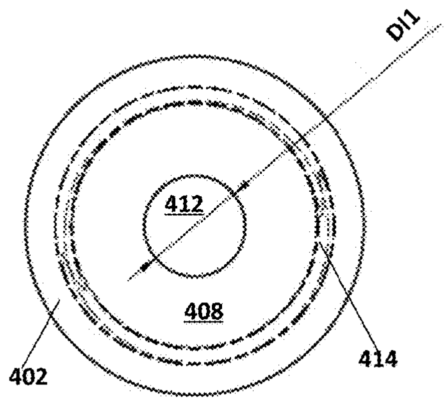

FIGS. 4A and 4B illustrates an embodiment of an insulator 400 that is compatible with body 300 as illustrated in FIGS. 3A and 3B. As is illustrated in FIGS. 4A and 4B, the example insulator 400 accommodates a single component passing through a through-hole 412. Insulator 400 can have a length of $L_I$1 and includes a top portion 402 and a barrel portion 404. Barrel portion 404 includes a bottom section 406, a central section 408, and a top section 410. Threads 414 are formed on the outer surface of central section 408. As is illustrated in FIG. 4A, bottom section 406 has a length along barrel 404 of $L_I$4. Center section 408 extends from bottom section 406 to a length of $L_I$3 (measured from the end of bottom section 406). Top section 410 extends from the end of center section 408 to a length of $L_I$2 (measured from the bottom of bottom section 406). Barrel portion 404 has an outer diameter $W_I$1 on which threads 414 are formed. Top section 402 has an outer diameter of $W_I$2 and extends from the top of top section 410 to length $L_I$1 of insulator 400. FIG. 4B illustrates a view from bottom section 406 further illustrating through-hole 412 formed in center section 408 of insulator 400. As is illustrated, through-hole 412 has a diameter of DI1 and is centered in barrel portion 404. In some embodiments, through-hole 412 may be offset in center section 408, but in the example illustrated in FIGS. 4A and 4B through-hole 412 is centered on insulator 400.

In operation, insulator 400 is screwed into body 300. Consequently, threads 414 of insulator 400 engage with threads 318 of body 300. As such, in some embodiments, where teeth 320 of threads 318 are round or square, then teeth 418 of threads 414 are also rounded or square to match, for example threads 414 can be knuckle threads with thread designation $Th_I$1 that matches with threads 318. In some embodiments, the bottom thread 416 of thread 414 can be angled up at an angle $\theta_I$1, which provides for more pressure between threads 414 and threads 318 that further enhances the seal between threads 318, especially bottom threads 322, and threads 414.

In a particular example of insulator 400 according to some embodiments, insulator 400 can have the following dimensions: $L_I$1=42.0 mm; $L_I$2=40.0 mm; $L_I$3=38.0 mm; $L_I$4=2.0 mm; $W_I$1=24.4 mm; $W_I$2=34.0 mm; $D_I$1=10.1 mm; $\theta_I$1=118°; and $Th_I$1=DIN 405 RD 28×⅛. Insulator 400 is formed of an insulator, for example polyvinylidene fluoride (PVDF) plastic. This particular example is provided as an example only and is not intended to be limiting. Insulator 400 can have any dimensions that are consistent with integration with body 300.

Figure 4C:
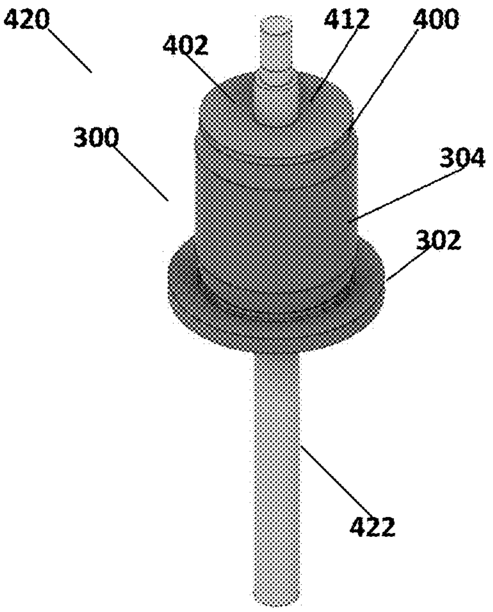
FIGS. 4C and 4D illustrate an assembled feedthrough with the insulator portion of FIGS. 4A and 4B in combination with the body portion of FIGS. 3A and 3B.
Figure 4D:
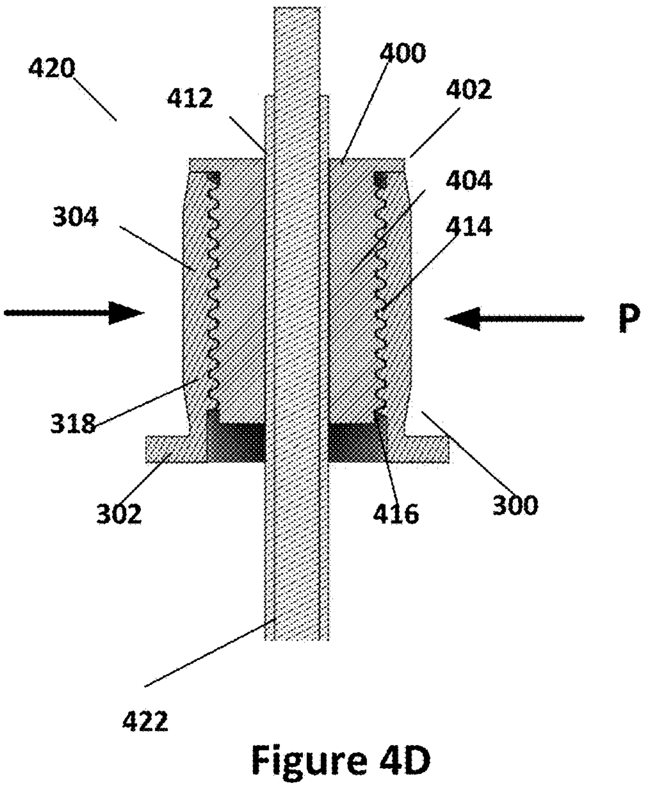

FIGS. 4C through 4D illustrate a feedthrough 420 formed from the integration of insulator 400 with body 300. Feedthrough 420 can be used to provide access to the interior of a pressure vessel and can be used as feedthrough 104 as is described above with respect to FIG. 1. In operation, through-hole 412 is sized to accept a component 422. FIG. 4C illustrates insulator 400 integrated with body 300. Component 422 passes through through-hole 412 in insulator 400, extending through top portion 402 and through the bottom of feedthrough 420.

FIG. 4D illustrates a cross section along the length of feedthrough 420 as illustrated in FIG. 4C. FIG. 4C further illustrates threads 414 of insulator 400 engaged with threads 318 of body 300. As is illustrated, tooth 416 of threads 414, which is one of the lower teeth of threads 414, serves to apply pressure on the tapered part threads 318, lower portion 322, to provide for a better seal, in addition to the seal formed by the threads themselves. As is further illustrated, pressure P can be applied to compress and plastically deform barrel portion 304, thereby further providing compressing and deforming barrel portion 404 of insulator and establishing a seal between barrel portion 404 and component 422.

Figure 5A:
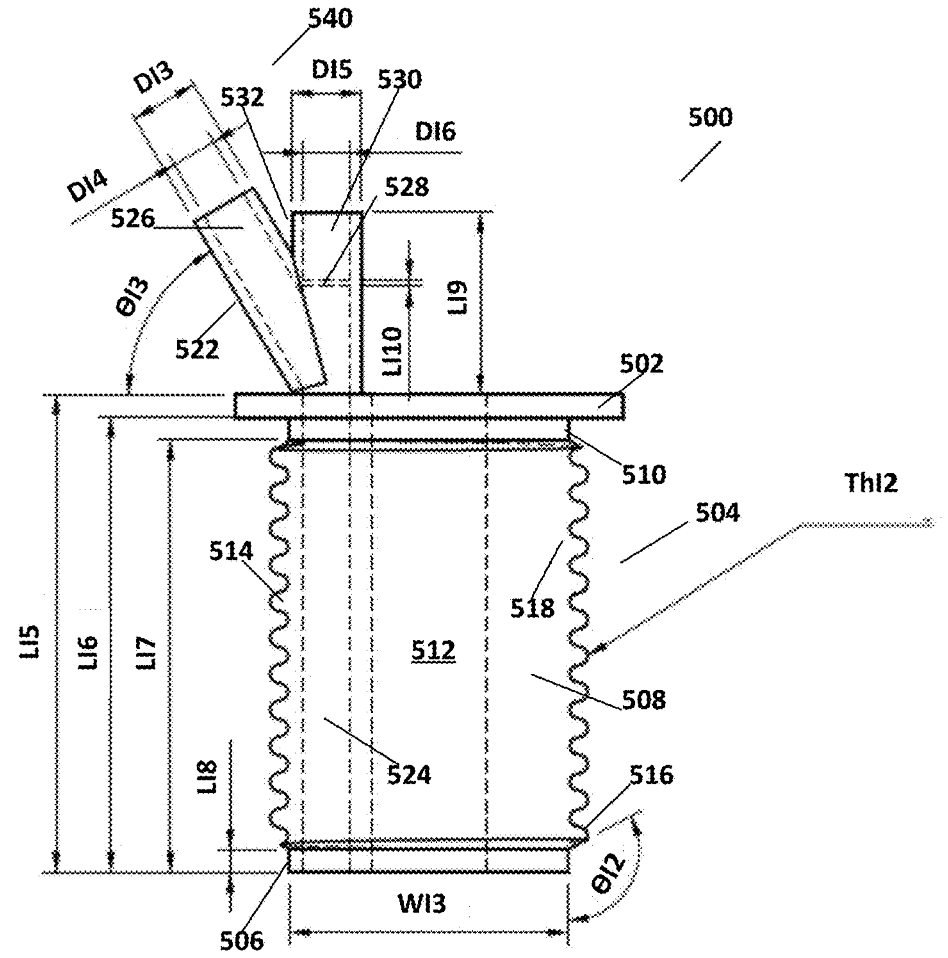
FIGS. 5A and 5B illustrate another embodiment of an insulator portion of a feedthrough according to some embodiments.
Figure 5B:
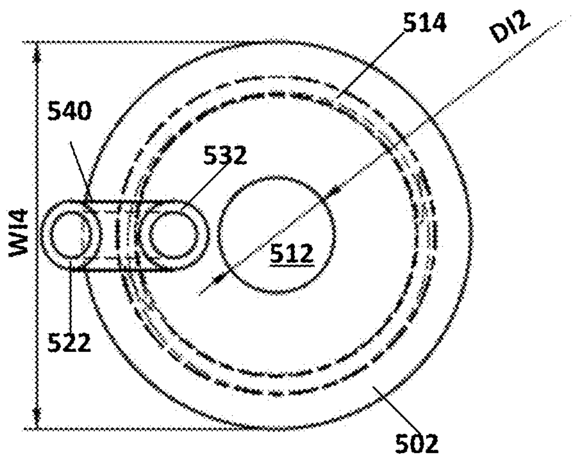

FIGS. 5A and 5B illustrates another embodiment of an insulator, insulator 500, that is compatible with body 300 as illustrated in FIGS. 3A and 3B. As is illustrated in FIGS. 5A and 5B, the example insulator 500 is compatible with a component passing through a through-hole 512 in insulator 500. Through-hole 512 can be centered in insulator 500 or may be offset from center. Insulator 500 also includes a fill tube structure 540 formed by pipes 522 and 532 coupled to a fill through-hole 524, as discussed further below.

As illustrated in FIG. 5A, insulator 500 can have a length of $L_I5$ and includes a top portion 502 and a barrel portion 504. Barrel portion 504 includes a bottom section 506, a central section 508, and a top section 510. Threads 514 are formed on the outer surface of central section 508. As is illustrated in FIG. 5A, bottom section 506 has a length along barrel 504 of $L_I8$. Center section 508 extends from bottom section 506 to a length of $L_I7$ (measured from the end of bottom section 506). Top section 510 extends from the end of center section 508 to a length of $L_I6$ (measured from the bottom of bottom section 506). Barrel portion 504 has an outer diameter $W_I3$ on which threads 514 are formed. Top portion 502 extends from the top of top section 510 to length $L_I5$ of insulator 500. FIG. 5B illustrates a view from bottom section 506 further illustrating through-hole 512 formed in center section 508 of insulator 500. As is illustrated in FIG. 5B, through-hole 512 has a diameter of $D_I2$ and is centered in barrel portion 404. In some embodiments, through-hole 512 may be offset in center section 508. Further, as shown in FIG. 5B, top section 510 of barrel portion 504 has a diameter of $W_I4$.

Figure 5C:
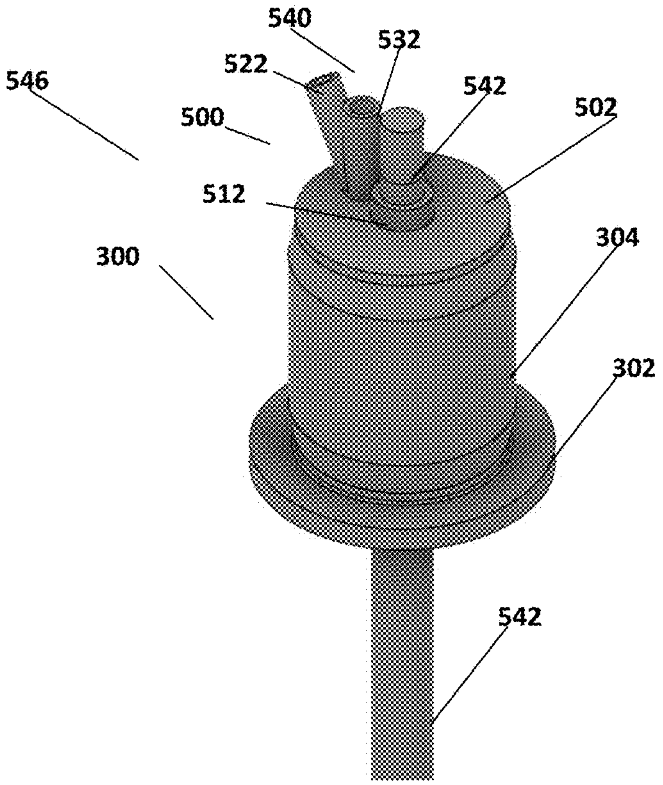
FIGS. 5C and 5D illustrated an assembled feedthrough with the insulator portion of FIGS. 5A and 5B in combination with the body portion of FIGS. 3A and 3B.

In operation, insulator 500 is screwed into body 300 to form a feedthrough 546 as illustrated in FIG. 5C. Consequently, threads 514 of insulator 500 engage with threads 318 of body 300. As such, in some embodiments, where teeth 320 of threads 318 are round or square, then teeth 518 of threads 514 are also rounded or square to match. In some embodiments, the bottom threads 322 of body 300 are tapered. In addition, in some embodiments, the bottom thread 516 of thread 514 can be angled up at an angle ea as is illustrated in FIG. 5A, which provides for more pressure between threads 514 and threads 318 that further enhances the seal between threads 318 and threads 514.

As is further illustrated in FIGS. 5A and 5B, insulator 500 includes a structure 540 that allows further access to the interior of a pressure vessel additional to through-hole 512. The example of structure 540 illustrated in FIGS. 5A and 5B facilitates a filling structure for addition and/or removal of gasses and/or liquids into/from the pressure vessel to which body 300 is attached. For example, in a hydrogen-metal battery electrolyte and gasses such as hydrogen gas may be added to the pressure vessel or the pressure vessel may be evacuated through structure 540.

As illustrated in FIG. 5A, a separate through-hole 524 is formed through insulator 500 and is attached to a first pipe 532 and a second pipe 522 that extend from top portion 502. First pipe 532 and second pipe 522 are integrally formed as part of insulator 500. First pipe 532 has a through-hole of 530 and second pipe 522 has a through hole of 526, which are joined with through-hole 524. As is illustrated in FIG. 5A, pipe 532 has an inner diameter DI6, an outer diameter DI5, forming through-hole 530, and a length of $L_I9$. Pipe 532 extends perpendicularly from top portion 502 such that through-hole 530 aligns with through-hole 524. Pipe 522 has an inner diameter $D_I4$ and outer diameter $D_I3$ that forms through-hole 526. Pipe 522 is angled an angle $\theta_I3$ from the surface of top portion 502 and is positioned such that through-hole 526 is coupled with through-hole 524. Further, pipe 522 may be formed above top portion 502.

Through-hole 530 may include a barrier 528 at a position that blocks through-hole 530 but allows access to through-hole 524 by through-hole 526 of pipe 522. In operation, once the pressure vessel has been charged through pipe 522, a plug may be inserted through through-hole 530 (breaking blockage 528) and into through-hole 524. As illustrated in FIG. 5A, barrier 528 can be a thin layer of thickness $L_I10$. When body 300, into which insulator 500 is incorporated, is compressed and plastically deformed a seal is formed between the plug and through-hole 524 as well as forming a seal between the walls of through-hole 512 and a component that is inserted through through-hole 512.

FIG. 5B illustrates a top view of insulator 500, which illustrates structure 540 having pipe 522 and pipe 532. Further, threads 514, top portion 502, and through-hole 512 is illustrated.

A specific example of insulator 500 can have the following dimensions: LI5=42.0 mm; LI6=40.0 mm; LI7=38.0 mm; LI8=2.0 mm; LI9=16.0 mm; LI10=0.5 mm; WI3=24.4 mm; WI4=34.0 mm; DI2=10.1 mm; DI3=6.0 mm; DI4=4.0 mm; DI5=6.0 mm; DI6=4.0 mm; θI2=118°; θI3=60°; and ThI2=DIN 405 RD 28×⅛. Insulator 500 may be formed of an insulating material, for example polyvinylidene fluoride (PVDF) plastic. This particular example is provided as an example only and is not intended to be limiting. Insulator 500 can have any dimensions that are consistent with integration with body 300.

Figure 5D:
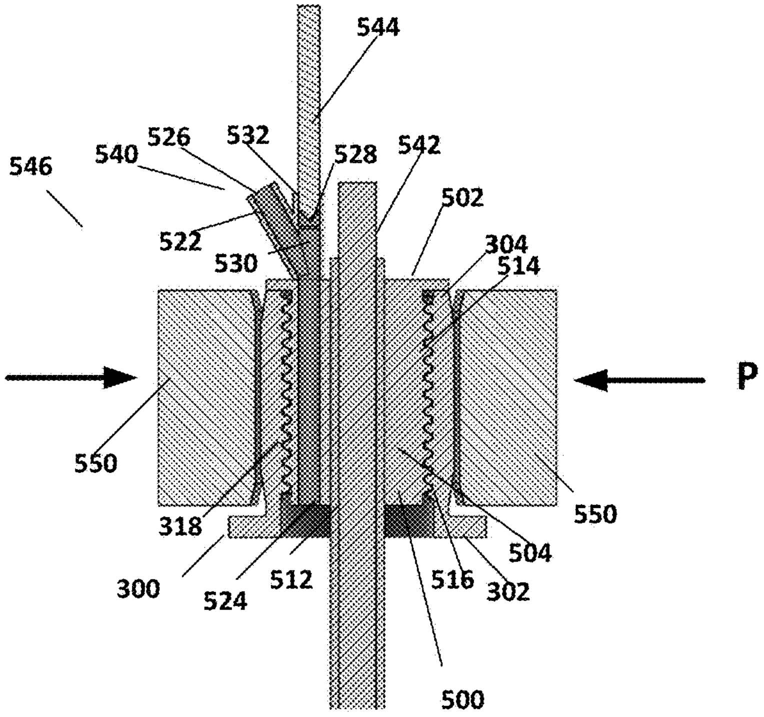

FIGS. 5C and 5D illustrate a feedthrough 546 according to some embodiments of the present disclosure. Feedthrough 546 can be used as feedthrough 104 in FIG. 1. FIG. 5D illustrates a cross-sectional view of feedthrough 546 as illustrated in FIG. 5C. FIG. 5C illustrates feedthrough 546 that includes insulator 500 incorporated with body 300. FIG. 5C illustrates component 542 extending through through-hole 512 in insulator 500. Further, FIG. 5C illustrates structure 540 that includes pipes 522 and 532. As discussed above, body 300 is mounted to a pressure vessel wall at base 302.

FIG. 5D illustrates a cross sectional view of feedthrough 546. As illustrated in FIG. 5D, a plug 544 can be positioned to be inserted through pipe 532 into through-hole 524. Plug 544 can be formed of a rigid rod, for example a metallic rod, sized appropriately to seal within through-hole 524. Threads 318 of body 300 are engaged with threads 514 of insulator 500. As illustrated, bottom threads 516 are tapered as indicated above to help form a seal between threads 318 of body 300 and threads 514 of insulator 500. In some embodiments, through-hole 512 can be sized such that a tight fit can be formed with component 542 to form an interference fit that forms a weak seal. Further, FIG. 5D illustrates the placement of press 550 that can apply pressure to compress and plastically deform barrel 304 of body 300 to finalize the seals between threads 318 of body 300 and threads 514 of insulator 500 as well as seals between insulator 500 and plug 544 and component 542.

Figure 6A:
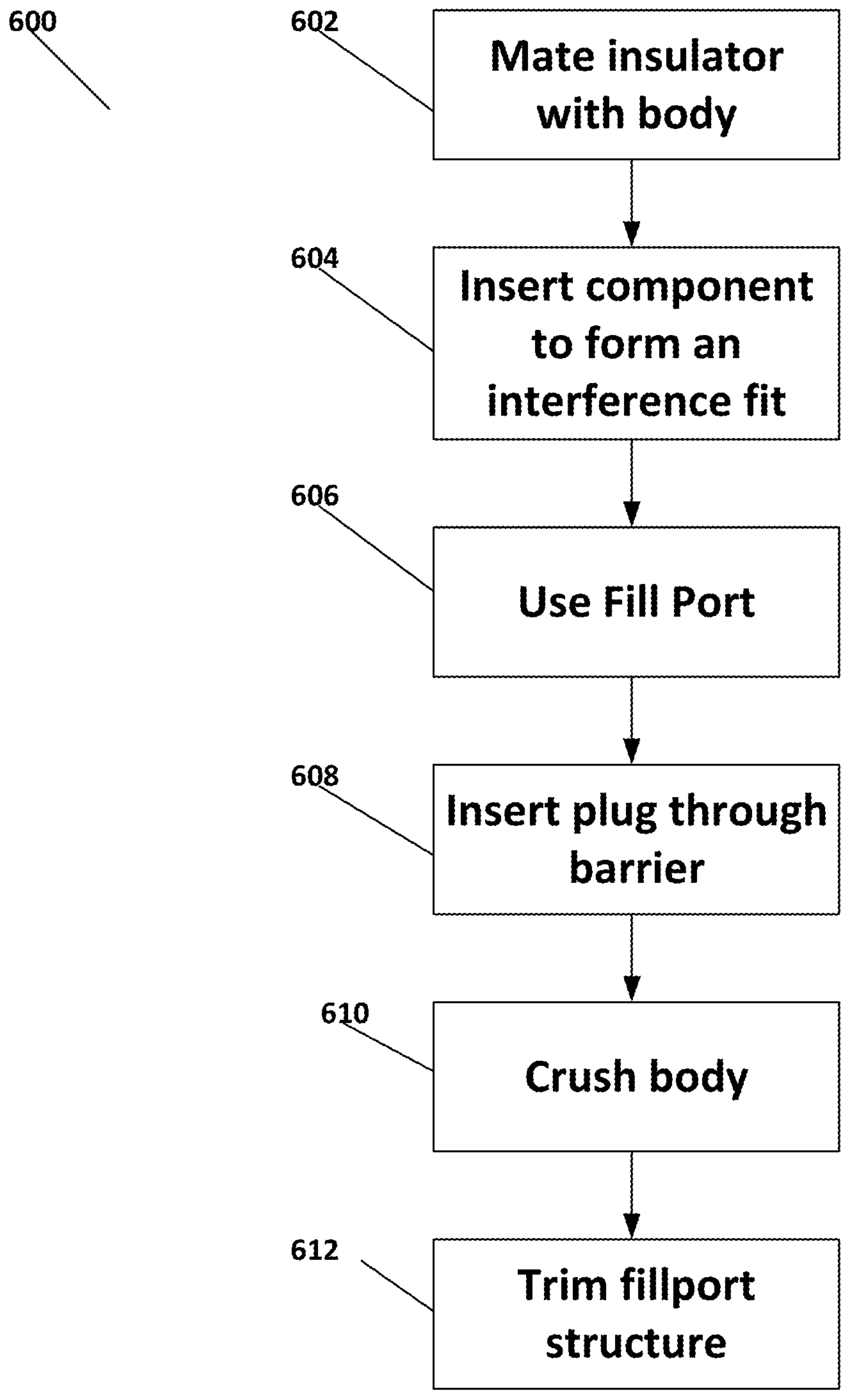
FIGS. 6A, 6B, 6C, 6D, 6E, 6F, and 6G illustrate use of a feedthrough consistent with the body illustrated in FIGS. 3A and 3B in combination with the insulator illustrated in FIGS. 5A through 5D.
Figure 6B:
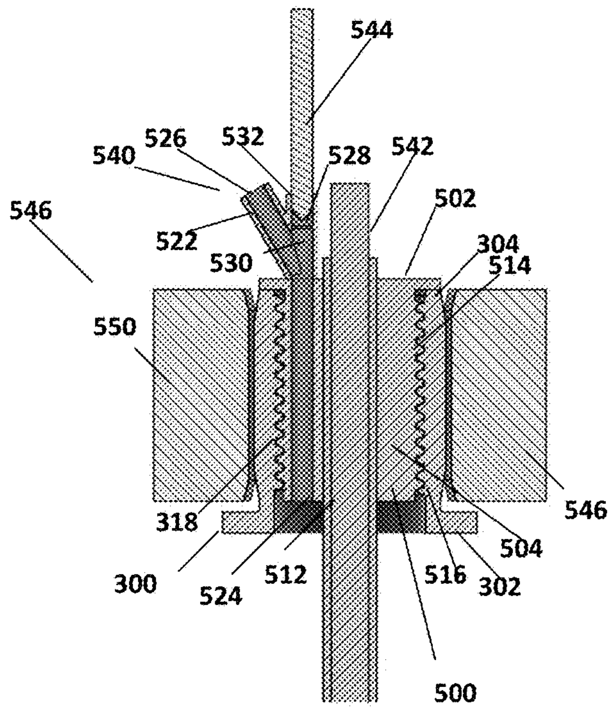

FIGS. 6A through 6G illustrates assembly and use method 600 of feedthrough 546 as described above with respect to FIGS. 5C and 5D above. Method 600 starts with step 602, where insulator 500 is screwed into body 300. As discussed above, body 300 has been attached to the wall of a pressure vessel by base 302. As is discussed above, with tapered threads 322 of body 300 and threads 516 of insulator 500, threads 318 of body 300 and threads 514 of insulator 500 form a seal as is illustrated in FIG. 6B, which illustrates threads 514 engaged with threads 318.

In step 604, component 542 is inserted through through-hole 512. FIG. 6B illustrates performance of steps 602 and 604. As discussed above, an interference fit is formed between component 542 and insulator 500 within through-hole 512. Further, tapered threads 322 in combination with angled threads 516 help create a seal between insulator 500 and body 300 at threads 318 and threads 514 as discussed above.

Figure 6C:
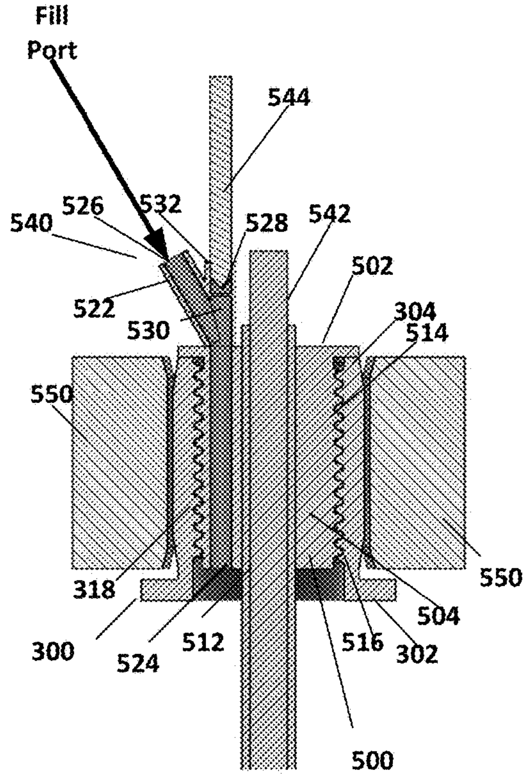

Once the seals between threads 318 and threads 514 is formed and the interference seal between component 542 and insulator 500 in through-hole 512 is formed in steps 602 and 604, method 600 proceeds to step 606 where structure 500 is used as needed according to the use of the pressure vessel that feedthrough 546 is attached. As is discussed, pipe 522 can be used to add or remove liquid or gas while pipe 532 is sealed by barrier 528. Consequently 522 can be used to pressurize the pressure vessel, or used to pull a vacuum on the pressure vessel, as is illustrated in FIG. 6C. In the example where pressure vessel is a hydrogen-metal battery, pipe 522 can be used to first pull a vacuum on the pressure vessel, then add electrolyte to the pressure vessel, then drain any excess electrolyte from the pressure vessel. Further, if needed, gasses such as hydrogen or an inert gas can be added to the pressure vessel.

Figure 6D:
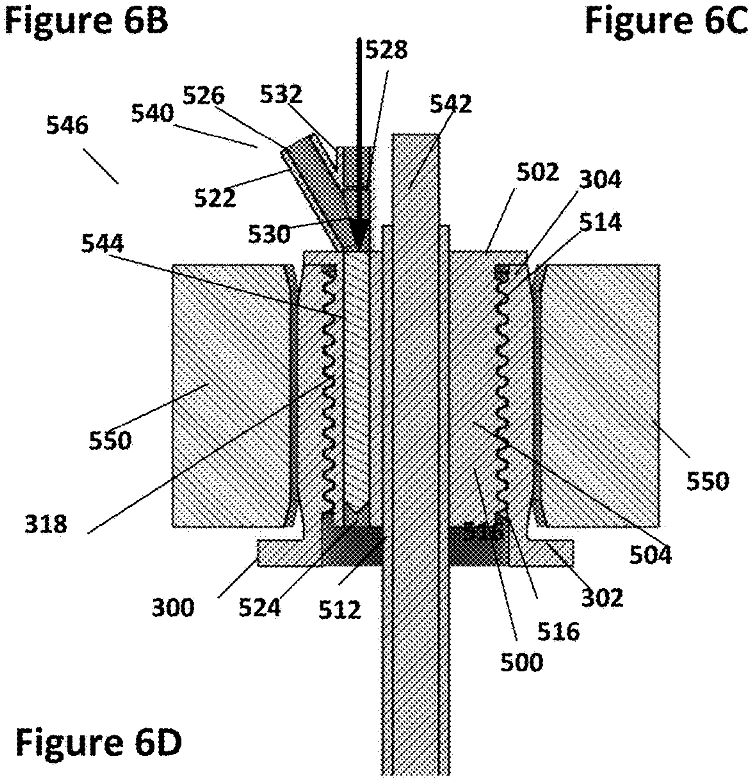
Figure 6E:
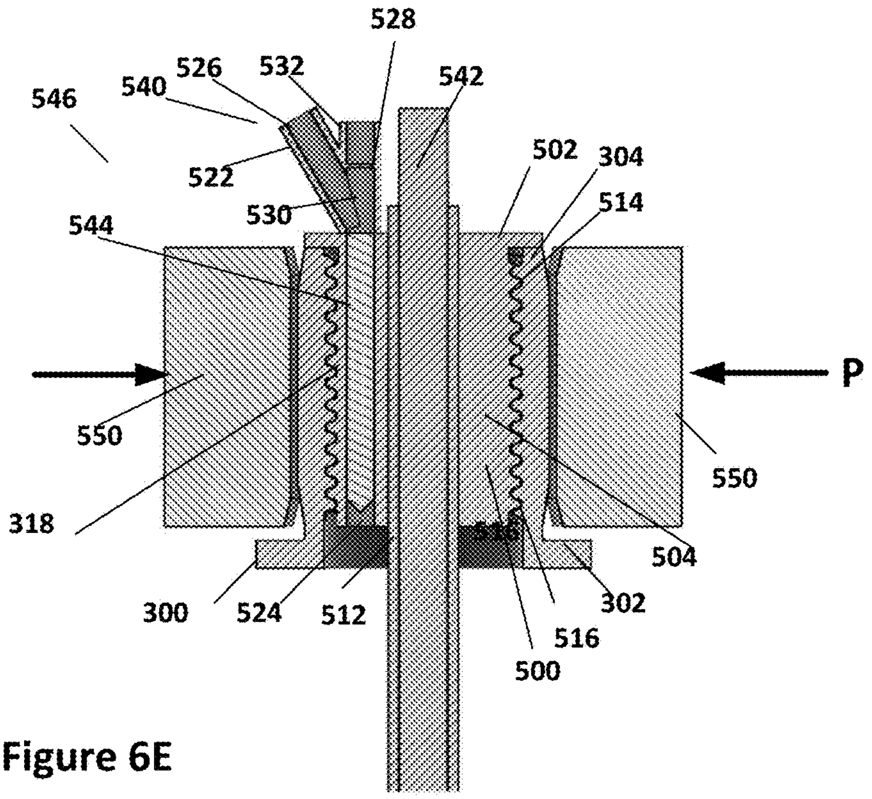

Once the appropriate conditions (i.e. addition of liquid and/or gas or evacuation) have been achieved using pipe 522, then method 600 proceeds to step 608. In step 608, as is illustrated in FIG. 6D, plug 544 is pushed through blockage 528 into through-hole 524. In step 610, as is illustrated in FIG. 6E, press 550 is used to compress and plastically deform barrel 304 of body 300 such that threads 318 are compressed and plastically deformed against threads 514, through-hole 512 is compressed and plastically deformed against component 542, and through hole 524 is compressed and plastically deformed against plug 544 to create strong seals against whatever pressure is in the pressure vessel to which feedthrough 546 is attached. Method 600 then proceeds to step 612.

Figure 6F:
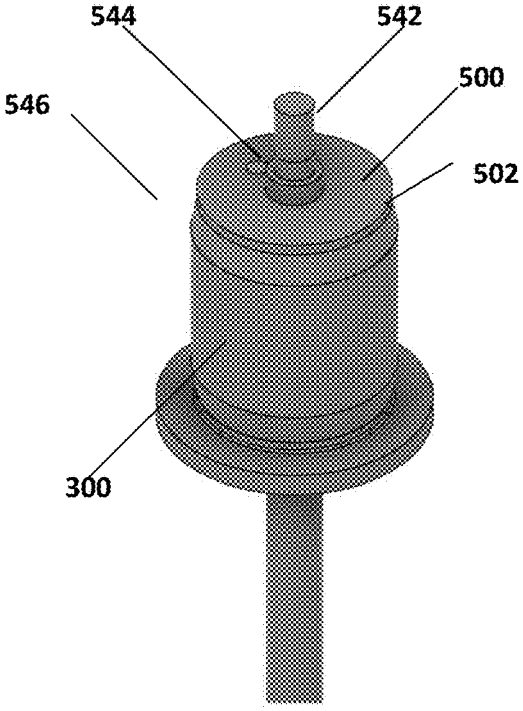
Figure 6G:
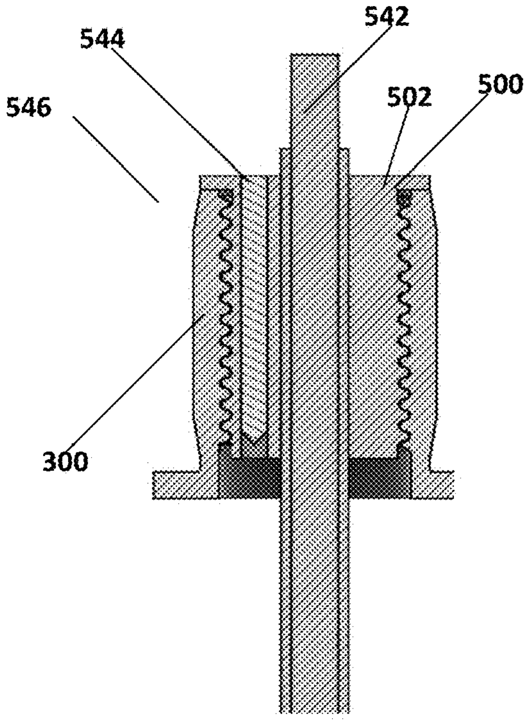

In step 612, pipes 522 and 532 of structure 540 can be removed from insulator 500 as is illustrated in FIGS. 6F and 6G. As is illustrated in FIGS. 6F and 6G, plug 544 can be arranged to align with the upper surface of top section 502 of insulator 500 and extends through a majority of through-hole 524. Structure 540 can then be cut off level with the top surface of top section 502 of insulator 500.

As discussed above, body 300 is mated with an insulator that can take multiple forms and provide multiple access through-holes. In some embodiments of the present disclosure, the insulator can include a fill tube structure in addition to a through-hole that receive a component such as a feedthrough terminal. In some embodiments, the insulator can provide through-holes for receipt of one or more electrical conductors in addition to the component, and in some further embodiments in combination with a fill structure as described with insulator 500.

Figure 7A:
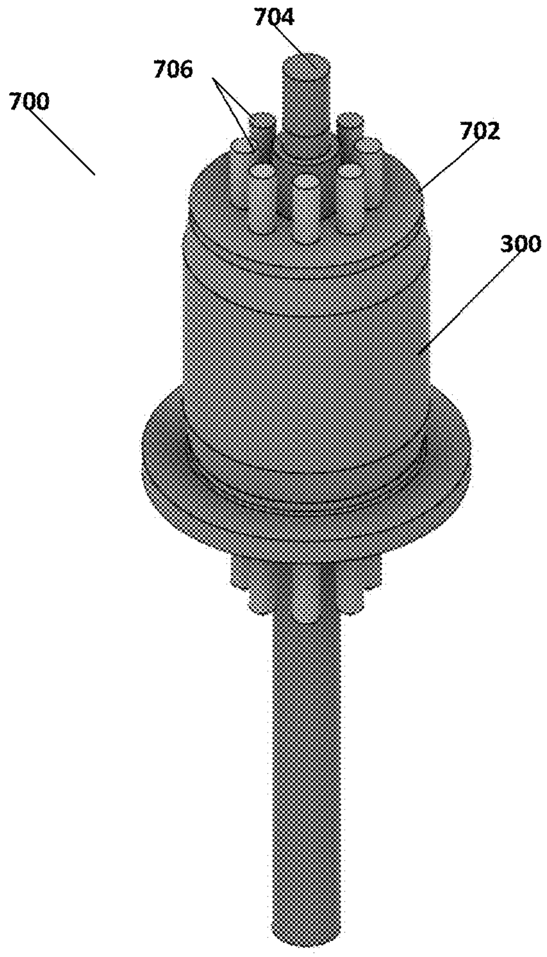
FIGS. 7A and 7B illustrates another embodiment of an insulator portion with a body portion to form a feedthrough according to some embodiments.
Figure 7B:
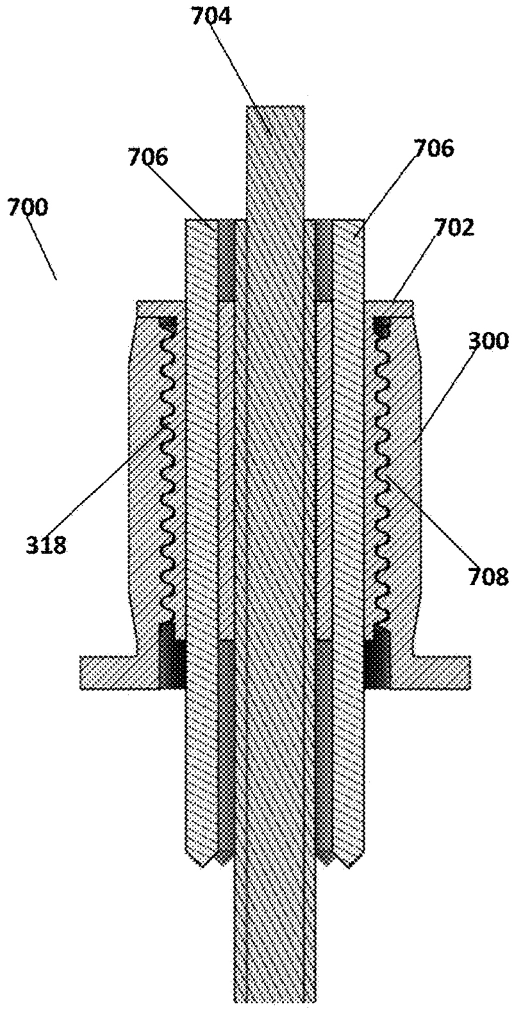

FIGS. 7A and 7B illustrates another example of a feedthrough 700 according to some embodiments of the present disclosure. As illustrated in FIG. 7A, body 300 as described above is integrated with an insulator 702 to form feedthrough 700. As illustrated in FIGS. 7A and 7B, insulator 702, which may have features similar to that shown above with respect to insulators 400 and 500 described above, includes through-holes that accommodate conductors 706. As with other embodiments, once body 300 is compressed and plastically deformed then seals are formed around conductors 706 as well as component 704. As such, insulator 702 can be formed substantially as described with insulators 400 and 500 above, with the addition of additional through-holes to accommodate additional structures such as conductors 706.

Embodiments of the present disclosure can exhibit one or more of the following aspects:

Aspect 1. A feedthrough, comprising: a body, the body including a base portion configured to be attached to a pressure vessel, a barrel portion coupled to the base portion, a through-hole formed through the base portion and the barrel portion, and threads formed on the inner portion of the through-hole, the threads having a rounded or a square thread; and an insulator, the insulator including a top portion, a barrel portion coupled to the top portion, a through-hole formed through the top portion and the barrel portion, and threads formed on the outer portion of the barrel portion; and wherein the insulator is screwed into the body to form the feedthrough.

Aspect 2. The feedthrough of Aspect 1, wherein the threads of the body and the threads of the insulator are each DIN 405 rounded threads.

Aspect 3. The feedthrough of any of Aspects 1-2, wherein bottom threads of the body are tapered.

Aspect 4. The feedthrough of any of Aspects 1-3, wherein a bottom thread of the insulator is angled upward.

Aspect 5. The feedthrough of any of Aspects 1-4, wherein the through-hole of the insulator accommodates a terminal.

Aspect 6. The feedthrough of any of Aspects 1-5, wherein the insulator further includes a fill structure.

Aspect 7. The feedthrough of any of Aspects 1-6, wherein the fill structure includes a fill through-hole formed through the top portion and the barrel portion of the insulator; a first pipe with an inner diameter aligned with the fill through-hole, the first pipe including a barrier; a second pipe with an inner diameter, the second pipe angled from the first pipe such that the inner diameter of the second pipe intersects the fill through-hole below the barrier.

Aspect 8. The feedthrough of any of Aspects 1-7, further including a plug designed to push through the barrier in the first pipe and into the fill through-hole.

Aspect 9. The feedthrough of any of Aspects 1-8, wherein the insulator includes one or more through-holes to accommodate conductors.

Aspect 10. A method of operating a feedthrough attached to a pressure vessel, comprising: screwing an insulator into a body, the body being attached to the pressure vessel, wherein the insulator and the body both include threads that are rounded or square to form a seal between the threads of the body and the threads of the insulator; inserting a component through a through-hole in the insulator; compressing the body to form seals between the component and the through-hole in the insulator and the threads of the insulator and the body; and removing the first pipe and the second pipe.

Aspect 11. The method of Aspect 10, wherein the threads of the body and the threads of the insulator are each DIN 405 rounded threads.

Aspect 12. The method of any of Aspects 10-11, wherein the threads of the body are tapered.

Aspect 13. The method of any of Aspects 10-12, wherein a bottom thread of the insulator is angled upward.

Aspect 14. A method of operating a feedthrough attached to a pressure vessel, comprising: screwing an insulator into a body, the body being attached to the pressure vessel, wherein the insulator and the body both include threads; inserting a component through a through-hole in the insulator such that an interference seal is formed between the component and the insulator; using a fill structure formed in the insulator, the fill structure including a first pipe extending from the insulator and communicating with a fill through-hole in the insulator and a second pipe angularly extending from the insulator and communicating with the fill through-hole in the insulator, wherein the first pipe includes a barrier; inserting a plug through the barrier in the first pipe and into the fill through-hole; compressing the body to form seals between the component and the through-hole in the insulator, the plug and the fill through-hole in the insulator, and the threads of the insulator and the body; and removing the first pipe and the second pipe.

Aspect 15. The method of Aspect 14, where using the fill structure includes pulling a vacuum on the pressure vessel; adding electrolyte to the pressure vessel; draining access electrolyte from the pressure vessel; and adding a gas to the pressure vessel.

Aspect 16. The method of any of Aspects 14-15, wherein using the fill structure includes pressurizing the pressure vessel.

Aspect 17. The method of any of Aspects 14-16, wherein the threads of the body and the threads of the insulator are rounded or square to form a seal between the threads of the body and the threads of the insulator.

Aspect 18. The method of any of Aspects 14-17, wherein the threads of the body and the threads of the insulator are each DIN 405 rounded threads.

Aspect 19. The method of Aspects 14-18, wherein the threads of the body are tapered.

Aspect 20. The method of Aspects 14-19, wherein the threads of the insulator is angled upward.

Aspect 21. A feedthrough, comprising: a body, the body including a base portion configured to be attached to a pressure vessel, a barrel portion coupled to the base portion, a through-hole formed through the base portion and the barrel portion, and threads formed on the inner portion of the through-hole; and an insulator, the insulator including a top portion, a barrel portion coupled to the top portion, a through-hole formed through the top portion and the barrel portion, threads formed on the outer portion of the barrel portion, a bottom thread of the threads being tapered, and one or more additional through-holes formed in the top portion and the barrel portion of the insulator; and wherein the insulator is screwed into the body to form the feedthrough.

Aspect 22. The feedthrough of Aspect 21, wherein the threads of the body and the threads of the insulator are each DIN 405 rounded threads.

Aspect 23. The feedthrough of Aspects 21-22, wherein the threads of the body are tapered.

Aspect 24. The feedthrough of Aspects 21-23, wherein the bottom thread of the insulator is tapered by being angled upward.

Aspect 25. The feedthrough of Aspects 21-24, wherein the through-hole of the insulator accommodates a terminal.

Aspect 26. The feedthrough of Aspects 21-25, wherein the one or more additional feedthroughs includes a fill structure.

Aspect 27. The feedthrough of Aspects 21-26, wherein the fill structure includes a fill through-hole formed through the insulator; a first pipe with an inner diameter aligned with the fill through-hole, the first pipe including a barrier; and a second pipe with an inner diameter, the second pipe angled from the first pipe such that the inner diameter of the second pipe intersects the fill through-hole below the barrier.

Aspect 28. The feedthrough of Aspects 21-27, further including a plug designed to push through the barrier in the first pipe and into the fill through-hole.

Aspect 29. The feedthrough of Aspects 21-28, wherein the one or more additional through-holes includes one or more through-holes to accommodate one or more conductors.

Embodiments of the invention described herein are not intended to be limiting of the invention. One skilled in the art will recognize that numerous variations and modifications within the scope of the present invention are possible. Consequently, the present invention is set forth in the following claims.

What is claimed is:

1. A feedthrough, comprising:

a body, the body including a base portion configured to be attached to a pressure vessel, a body barrel portion coupled to the base portion, a body through-hole formed through the base portion and the barrel portion, and body threads formed on the inner portion of the body through-hole, the body threads having a rounded or a square thread; and an insulator, the insulator including a top portion, an insulator barrel portion coupled to the top portion, one or more through-holes formed through the top portion and the insulator barrel portion to receive one or more components, and insulator threads formed on an outer portion of the insulator barrel portion; and wherein the insulator is screwed into the body to form the feedthrough such that the insulator threads engage the body threads, wherein the pressure vessel is configured to seal to the base portion when the base portion is attached to the pressure vessel, wherein the insulator is sealed to the body through engagement of the body threads with the insulator threads and further sealed through crushing the body barrel portion and the insulator barrel portion, and wherein the insulator is sealed to the one or more components through crushing the body barrel portion and the insulator barrel portion, wherein the insulator further includes a fill structure separate from the one or more through holes, the fill structure allowing for addition and removal of gasses or liquid in the pressure vessel, and further is configured such that the fill structure is sealed against pressure from the pressure vessel after crushing the body barrel portion and the insulator barrel portion, wherein the fill structure includes a fill through-hole formed through the insulator top portion and the insulator barrel portion of the insulator, a first pipe with an inner diameter aligned with the fill through-hole that extends from the top portion of the insulator, the first pipe including a breakable barrier, a second pipe with an inner diameter, the second pipe angled from the first pipe such that the inner diameter of the second pipe intersects the fill through-hole in the first pipe below the barrier but above the top portion of the insulator, wherein the fill structure can be used through the second pipe to exchange liquids or gasses with the pressure vessel while the first pipe is blocked by the barrier, prior to crushing the body barrel portion and the insulator barrel portion.

2. The feedthrough of claim 1, wherein bottom threads of the body threads are tapered by having decreasing pitch diameter.

3. The feedthrough of claim 1, wherein a bottom thread of the insulator is angled upward.

4. The feedthrough of claim 1, further including a plug designed to push through the breakable barrier in the first pipe and into the fill through-hole in the barrel portion of the insulator prior to crushing the body barrel portion and the insulator barrel portion to seal the fill structure.

5. The feedthrough of claim 1, wherein the body threads and insulator threads are each DIN 405 rounded threads.

6. The feedthrough of claim 1, wherein the one or more components includes an electrical terminal.

7. The feedthrough of claim 1, wherein the one or more through-holes includes a plurality of through-holes to accommodate a plurality of electrical conductors.

* * * * *